US012033627B2

(12) United States Patent
Yokoyama et al.

(10) Patent No.: US 12,033,627 B2
(45) Date of Patent: Jul. 9, 2024

(54) RESPONSE GENERATION DEVICE AND RESPONSE GENERATION METHOD

(71) Applicant: SONY GROUP CORPORATION, Tokyo (JP)

(72) Inventors: Saki Yokoyama, Tokyo (JP); Juri Yaeda, Tokyo (JP); Chiaki Miyazaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 287 days.

(21) Appl. No.: 17/441,388

(22) PCT Filed: Feb. 19, 2020

(86) PCT No.: PCT/JP2020/006526
§ 371 (c)(1),
(2) Date: Sep. 21, 2021

(87) PCT Pub. No.: WO2020/202862
PCT Pub. Date: Oct. 8, 2020

(65) Prior Publication Data
US 2022/0172716 A1 Jun. 2, 2022

(30) Foreign Application Priority Data
Mar. 29, 2019 (JP) .................. 2019-067768

(51) Int. Cl.
*G10L 15/22* (2006.01)
*G10L 15/26* (2006.01)

(52) U.S. Cl.
CPC ............. *G10L 15/22* (2013.01); *G10L 15/26* (2013.01); *G10L 2015/223* (2013.01); *G10L 2015/227* (2013.01); *G10L 2015/228* (2013.01)

(58) Field of Classification Search
CPC ... G10L 15/22; G10L 15/26; G10L 2015/223; G10L 2015/227; G10L 2015/228;
(Continued)

(56) References Cited

U.S. PATENT DOCUMENTS

| 2012/0016678 | A1 | 1/2012 | Gruber et al. |
| 2017/0206243 | A1* | 7/2017 | Ono .................. G06F 16/24578 |
| 2019/0066676 | A1* | 2/2019 | Ogawa .................... G10L 15/30 |

FOREIGN PATENT DOCUMENTS

| CA | 2787351 A1 | 7/2011 |
| CN | 102792320 A | 11/2012 |

(Continued)

OTHER PUBLICATIONS

International Search Report and Written Opinion of PCT Application No. PCT/JP2020/006526, dated May 19, 2020, 08 pages of ISRWO.

*Primary Examiner* — Yogeshkumar Patel
(74) *Attorney, Agent, or Firm* — CHIP LAW GROUP

(57) ABSTRACT

A response generation device according to the present disclosure includes: an acquisition unit that acquires input information serving as a trigger for generating a response to a user; and a response generation unit that generates the response to the user by using related information related to the input information in a case where it is determined that the response to the user is not able to be generated on the basis of only the input information. For example, the acquisition unit acquires voice information uttered by the user as the input information.

14 Claims, 7 Drawing Sheets

(58) Field of Classification Search
CPC ............... G06F 16/909; G06F 16/9035; G06F 16/9038; G06F 16/243; G06F 16/3329
See application file for complete search history.

(56) References Cited

FOREIGN PATENT DOCUMENTS

| | | |
|---|---|---|
| EP | 2526511 A2 | 11/2012 |
| GB | 2490444 A | 10/2012 |
| JP | 2014-222511 A | 11/2014 |
| KR | 10-2012-0120316 A | 11/2012 |
| WO | 2011/088053 A2 | 7/2011 |
| WO | 2016/158005 A | 10/2016 |

* cited by examiner

| CONTENT ID | TYPE | NAME | ... |
|---|---|---|---|
| ... | ... | ... | ... |
| J01 | TELEVISION PROGRAM | K01 | ... |
| J02 | MOVIE | K02 | ... |
| J03 | MUSIC (SONG) | K03 | ... |
| J04 | ARTIST | K04 | ... |
| J05 | PLACE NAME | K05 | ... |
| J06 | GAME | K06 | ... |
| J07 | CELEBRITY | K07 | ... |
| ... | ... | ... | ... |

RESPONSE GENERATION DEVICE AND RESPONSE GENERATION METHOD

CROSS REFERENCE TO RELATED APPLICATIONS

This application is a U.S. National Phase of International Patent Application No. PCT/JP2020/006526 filed on Feb. 19, 2020, which claims priority benefit of Japanese Patent Application No. JP 2019-067768 filed in the Japan Patent Office on Mar. 29, 2019. Each of the above-referenced applications is hereby incorporated herein by reference in its entirety.

FIELD

The present disclosure relates to a response generation device and a response generation method. Specifically, the present disclosure relates to processing of generating a response to be output to a user who uses an information device.

BACKGROUND

With the spread of smartphones and smart speakers, interactive systems have been widely used for making appropriate responses to users in response to utterances received from users, actions of users, and the like. In the interactive system, it is required to accurately recognize voice of a user and make an appropriate response.

For example, a technology is known that generates details of a response generated depending on a genre or the like of content in response to an inquiry from a user with respect to the content output toward the user.

CITATION LIST

Patent Literature

Patent Literature 1: WO 2016/158005 A

SUMMARY

Technical Problem

According to the above conventional technology, it is possible to present a response to a question uttered with respect to the content by the user while viewing the content, in an appropriate form to the user who asked the question.

However, in the conventional technology, a response is generated or a timing of outputting the response is determined on the basis of information regarding the content, and thus it is not always possible to implement robust interactive processing with respect to, for example, various utterances of a user who is not viewing the content.

Thus, in the present disclosure, a response generation device and a response generation method are devised capable of implementing robust interactive processing with respect to information input from a user.

Solution to Problem

According to the present disclosure, a response generation device includes an acquisition unit that acquires input information serving as a trigger for generating a response to a user; and a response generation unit that generates the response to the user by using related information related to the input information in a case where it is determined that the response to the user is not able to be generated on a basis of only the input information.

DESCRIPTION OF EMBODIMENTS

Figure 1:
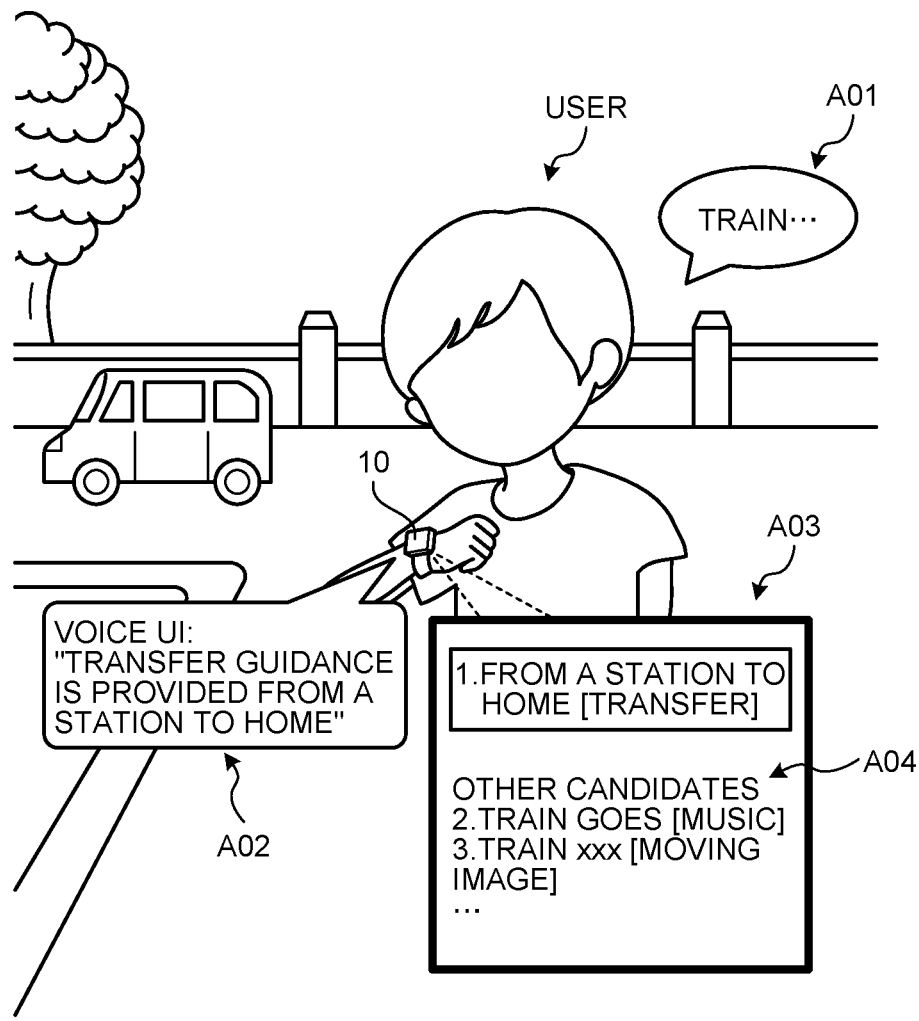
FIG. 1 is a diagram illustrating an example of information processing according to an embodiment.

Hereinafter, embodiments of the present disclosure will be described in detail with reference to the drawings. Note that, in each of the following embodiments, the same parts are denoted by the same reference numerals, and redundant description will be omitted.

The present disclosure will be described in accordance with the following order of items.

1. Embodiment
   1-1. Example of information processing according to embodiment
   1-2. Configuration of response generation system according to embodiment
   1-3. Procedure of information processing according to embodiment
   1-4. Modification according to embodiment
   1-4-1. Gesture information
   1-4-2. Activation word
   1-4-3. Provision of information used for response generation
   1-4-4. Example of priority determination
   1-4-5. Use of interaction history
   1-4-6. Application of response generation processing of present disclosure
2. Other embodiments
3. Effects of response generation device according to present disclosure
4. Hardware configuration

1. EMBODIMENT

[1-1. Example of Information Processing According to Embodiment]

An example of information processing according to an embodiment will be described with reference to FIG. 1. FIG. 1 is a diagram illustrating an example of the information processing according to the embodiment. The information processing according to the embodiment is executed by a response generation device 10 illustrated in FIG. 1.

The response generation device 10 is an example of a response generation device according to the present disclosure. The response generation device 10 is a device that interacts with a user, and performs various types of information processing such as voice recognition and response. The voice recognition, response processing by voice, and the like executed by the response generation device 10 may be referred to as an agent function. Furthermore, the response generation device 10 may be referred to as an agent device.

In the embodiment, an example will be described in which the response generation device 10 is a so-called smart watch. Note that, the response generation device 10 may include not only a speaker unit that performs voice output but also a display unit (liquid crystal display or the like) that outputs a video or the like. Furthermore, the response generation device 10 may be a smartphone, a tablet terminal, a smart speaker, or the like. In this case, the smartphone or the tablet terminal functions as the response generation device 10 according to the present disclosure by executing a program (application) for implementing response generation processing of the present disclosure.

Furthermore, the response generation device 10 may be a wearable device such as an eyeglass type terminal in addition to the smart watch and the smartphone. Furthermore, the response generation device 10 may be implemented by various smart devices having an information processing function. For example, the response generation device 10 may be: a smart home appliance such as a television, an air conditioner, or a refrigerator; a smart vehicle such as an automobile; a drone; a home robot; or the like.

In the example of FIG. 1, the response generation device 10 executes response processing for information (hereinafter referred to as "input information") serving as a trigger for generating a response, such as a collected voice or an action of the user. For example, the response generation device 10 recognizes a question uttered by the user, performs voice output of an answer to the question, and displays information regarding the question on a screen. Note that, various known technologies may be used for the voice recognition processing, output processing, and the like executed by the response generation device 10.

Meanwhile, the input information acquired by the agent device does not necessarily include sufficient information for generating a response. For example, there may be a case where the user omits a part of an utterance with respect to the agent device as in daily conversation, or cannot make an appropriate utterance due to forgetfulness or the like. Specifically, there may be a case where the agent device cannot recognize "what day and what time" to set an alarm even if the user utters only "Set an alarm". In this case, the agent device outputs ask-back such as "What time would you like to set?", or an error such as "The request could not be understood". For this reason, it is necessary for the user to perform troublesome processing of performing a plurality of exchanges with the agent device. Furthermore, at this time, even if the user utters "tomorrow's", an operation command regarding the utterance cannot be specified depending on the agent device, and an error may be further output.

Furthermore, the user may forget, for example, an activation word (a word serving as a trigger for activating an agent function, or the like) for the agent device. In such a case, even if the user makes some utterance to the agent device, the user cannot obtain a response from the agent device.

That is, the agent device has a problem of implementing interactive processing robust to information (utterance or the like) input from the user.

Thus, the response generation device 10 according to the present disclosure solves the above problem by information processing described below. Specifically, when acquiring the input information serving as a trigger for generating the response to the user, the response generation device 10 determines whether or not the response to the user can be generated on the basis of only the input information. In other words, the response generation device 10 determines whether or not the input information is an incomplete request utterance. Then, in a case where it is determined that the response to the user cannot be generated on the basis of only the input information, the response generation device 10 generates the response to the user by using related information related to the input information. Note that, in the present disclosure, the incomplete request utterance is an utterance in which there is a possibility that a user's intention cannot be understood only by the utterance, and a plurality of different responses is generated, for example, "tomorrow's" described above.

As described above, in a case where it is determined that the request of the user is incomplete, the response generation device 10 collects information related to the request and generates a response on the basis of the collected information. As a result, even in a case where the information input from the user is incomplete, the response generation device 10 can generate a response as appropriate as possible, instead of a response of ask-back such as "I did not catch that well". That is, the response generation device 10 implements robust (robust) interactive processing on information input from the user.

Hereinafter, an outline of an example of information processing (response generation processing) according to the present disclosure will be described with reference to FIG. 1.

As illustrated in FIG. 1, the user utters "train . . . " to input a voice A01 including details such as "train" to the response generation device 10.

The response generation device 10 starts response generation processing with the voice A01 as input information. For example, the response generation device 10 acquires the voice A01, and generates a response corresponding to the voice A01 through automatic speech recognition (ASR) processing, natural language understanding (NLU) processing, and the like. For example, in a case where the voice A01 includes an intention of a question from the user, the response generation device 10 recognizes the intention of the question as input information and generates an answer to the intention of the question as a response.

In the embodiment, the response generation device 10 recognizes that details of the voice A01 includes a character string "train" on the basis of the voice A01. Here, the response generation device 10 determines that the intention of the user cannot be understood only with the recognized detail "train". In other words, the response generation device 10 determines that the voice A01 is an incomplete utterance (request).

For example, in a case where an operation command that is information for specifying details of the response to the user cannot be determined only from the input information, the response generation device 10 determines that the utterance of the user is an incomplete utterance. The details of the response to the user may be read as a response field or a response type, and is generally referred to as an interactive domain or the like in the interactive processing. That is, in a case where it cannot be determined what kind of operation should be executed in response to the request from the user, the response generation device 10 determines that the utterance of the user is an incomplete utterance. Specifically, the response generation device 10 determines that the utterance of the user is an incomplete utterance in a case where the operation to be executed is unknown, for example, whether to search for train operation information, output a weather forecast, purchase a specific product, or reproduce news in response to the request of the user.

Alternatively, even in a case where the operation command can be determined only from the input information, the response generation device 10 may determine that the utterance is an incomplete utterance in a case where attached information that is information used for generating the response corresponding to the operation command cannot be determined only from the input information. The attached information is, for example, information for specifying details of an operation when the response generation device 10 tries to execute the operation corresponding to the operation command. For example, in a case where the user utters only "Set an alarm", information for specifying the details of the operation such as "what day and what time" for the operation command "Set an alarm" corresponds to the attached information.

In a case where it is determined that the utterance of the user is an incomplete utterance, the response generation device 10 collects related information that is information related to the input request.

The related information is various types of information estimated from the input information. For example, the related information is information on a content related to a character string corresponding to the input information. The content includes, for example, widely distributed services and products such as a television program, a movie, music, and a game.

Alternatively, the related information may be context information that is information indicating a situation at a time-point when the response generation device 10 has acquired the input information. The context information includes, for example, information regarding the user who has uttered the request, and various types of information regarding the situation such as the date and time and place of the utterance. The information regarding the user includes various types of information such as attribute information such as the age, gender, residence, and hometown of the user, and schedule information registered by the user.

Alternatively, the related information may be an interaction history with the user before the input information is acquired, a use history of a service of the user used via the response generation device 10, or the like. For example, the related information may include various types of information such as a name of a product purchased by the user in the past, a type of a service frequently used by the user, and a search history of a website of the user.

The response generation device 10 generates a response to the user on the basis of the collected related information. Although details will be described later, the response generation device 10 performs comprehensive determination on the input information on the basis of the collected related information, and outputs a response determined to be suitable for the current situation to the user.

For example, it is assumed that, the response generation device 10 refers to related information indicating that a frequency of using a service "train transfer guidance" by the user is high in a case where the user is in a context in which the user is during outing, in the interaction with the user in the past. Moreover, the response generation device 10 refers that the current context information of the user is "during outing". Here, the response generation device 10 has recognized a word "train" of the user, thereby determining that a likelihood that the user desires to use the service "train transfer guidance" is high.

Through these pieces of determination processing, as illustrated in FIG. 1, the response generation device 10 activates a voice user interface (UI), generates a response A02 related to "train transfer guidance" such as "transfer guidance is provided from A station to home", and outputs the response A02 to the user.

Note that, the response generation device 10 may generate a plurality of responses on the basis of the related information. Furthermore, the response generation device 10 may assign an order to the generated plurality of responses and present the plurality of generated responses to the user together with the assigned order.

For example, it is assumed that the response generation device 10 refers to related information indicating that there is a history in which the user has reproduced music having a song name "the train goes" in the past. In this case, the response generation device 10 determines that the input information "train" has a high likelihood that the user desires to reproduce the song "the train goes". Furthermore, it is assumed that the response generation device 10 refers to related information indicating that there is a history in which the user has reproduced a moving image named "train XXX" in the past. In this case, the response generation device 10 determines that the input information "train" has a high likelihood that the user desires to reproduce the moving image named "train XXX".

In such a case, the response generation device 10 activates a display UI, for example, and displays a response A04 that is a response candidate on a display A03. For example, in a case where the response A02 is not a response desired by the user, the user can select any of the details of the response A04 and output the desired response.

As described above, the response generation device 10 acquires the input information serving as a trigger for generating the response to the user, and generates the response to the user by using the related information related to the input information in a case where it is determined that the response to the user cannot be generated on the basis of only the acquired input information. As a result, the response generation device 10 can generate the response to the user even in a case where the input information is incomplete, so that robust interactive processing can be implemented.

Note that, in the example of FIG. 1, an example has been described in which the input information is the voice A01; however, the response generation device 10 may acquire, as the input information, information obtained by detecting an action of the user, such as a gesture of the user, in addition to the voice.

[1-2. Configuration of Response Generation System According to Embodiment]

Figure 2:
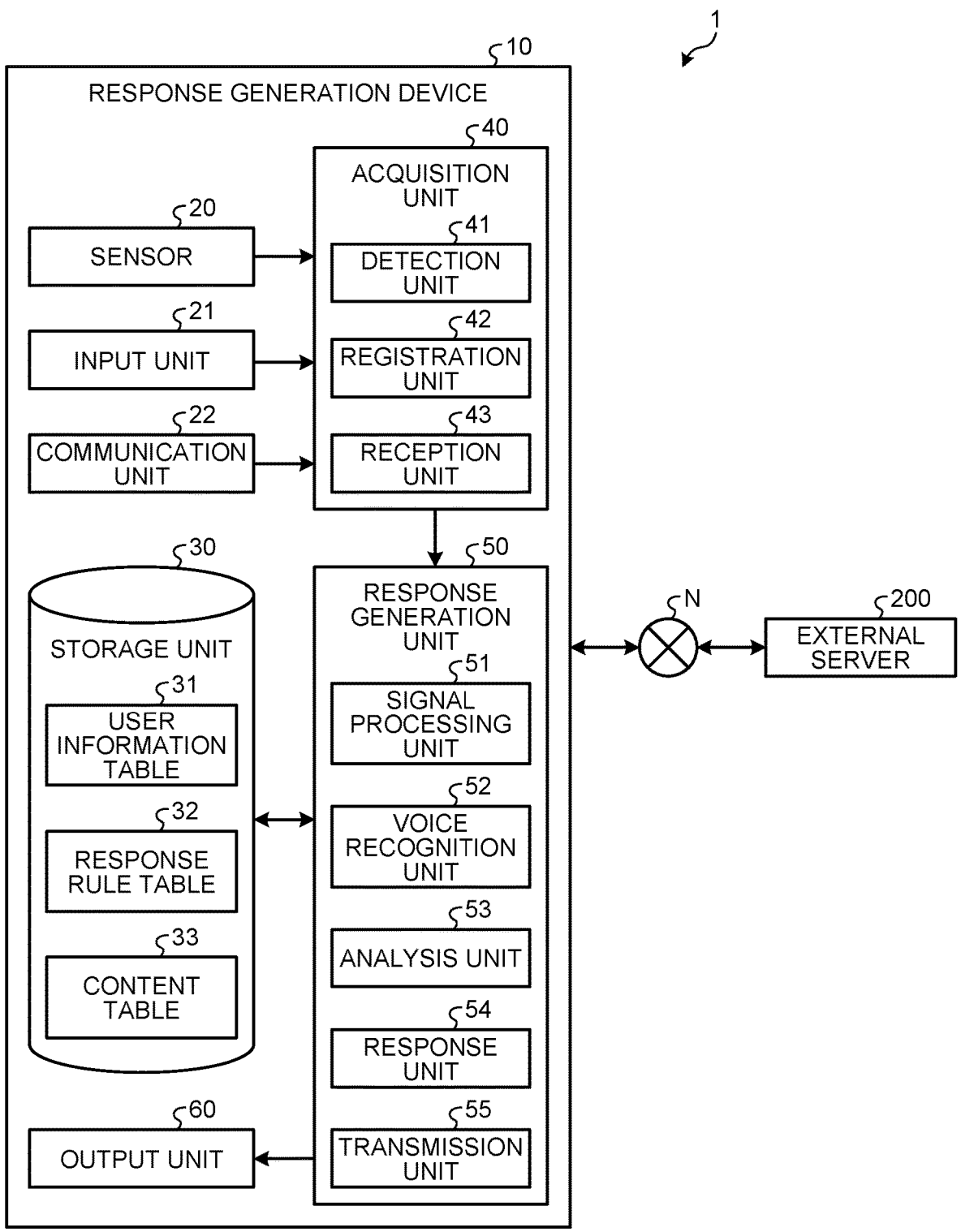
FIG. 2 is a diagram illustrating a configuration example of a response generation system according to the embodiment.

Next, a configuration will be described of a response generation system 1 including the response generation device 10. FIG. 2 is a diagram illustrating a configuration example of the response generation system 1 according to the embodiment.

As illustrated in FIG. 2, the response generation system 1 includes the response generation device 10 and an external server 200. The response generation device 10 and the external server 200 are communicably connected in a wired or wireless manner via a network N (for example, the Internet) illustrated in FIG. 2. Note that, although not illustrated in FIG. 2, the response generation system 1 may include a plurality of the response generation devices 10 and the external servers 200.

The external server 200 is a service server that provides various services. For example, the external server 200 provides weather information, traffic information, and the like to the response generation device 10 in accordance with a request from the response generation device 10. For example, in a case where an inquiry about weather information is made from the response generation device 10, the external server 200 returns weather information depending on the date and time and place to the response generation device 10.

The response generation device 10 is an information processing terminal that executes response generation processing according to the present disclosure. As illustrated in FIG. 2, the response generation device 10 includes a sensor 20, an input unit 21, a communication unit 22, a storage unit 30, an acquisition unit 40, a response generation unit 50, and an output unit 60.

The sensor 20 detects various types of information. For example, the sensor 20 includes a microphone that collects a voice uttered by the user and a camera that acquires an action of the user as a video.

Furthermore, the sensor 20 may include: a touch sensor that detects that the user touches the response generation device 10; an acceleration sensor; a gyro sensor; or the like. Furthermore, the sensor 20 may include a sensor that detects a current position of the response generation device 10. For example, the sensor 20 may receive a radio wave sent from a global positioning system (GPS) satellite and detect position information (for example, latitude and longitude) indicating the current position of the response generation device 10 on the basis of the received radio wave.

Furthermore, the sensor 20 may include a radio wave sensor that detects a radio wave emitted by an external device, an electromagnetic wave sensor that detects an electromagnetic wave, or the like. Furthermore, the sensor 20 may detect an environment in which the response generation device 10 is placed. Specifically, the sensor 20 may include an illuminance sensor that detects illuminance around the response generation device 10, a luminosity sensor that detects luminosity around the response generation device 10, a humidity sensor that detects humidity around the response generation device 10, a geomagnetic sensor that detects a magnetic field at a location of the response generation device 10, and the like.

The input unit 21 is a device for receiving various operations from the user. For example, the input unit 21 is implemented by a keyboard, a mouse, a touch panel, or the like.

The communication unit 22 is implemented by, for example, a network interface card (NIC) or the like. The communication unit 22 is connected to the network N in a wired or wireless manner, and transmits and receives information to and from the external server 200 and the like via the network N.

The storage unit 30 is implemented by, for example, a semiconductor memory element such as a random access memory (RAM) or a flash memory, or a storage device such as a hard disk or an optical disk. In the embodiment, the storage unit 30 includes, for example, a user information table 31, a response rule table 32, and a content table 33. Hereinafter, each data table will be described in order.

Figure 3:
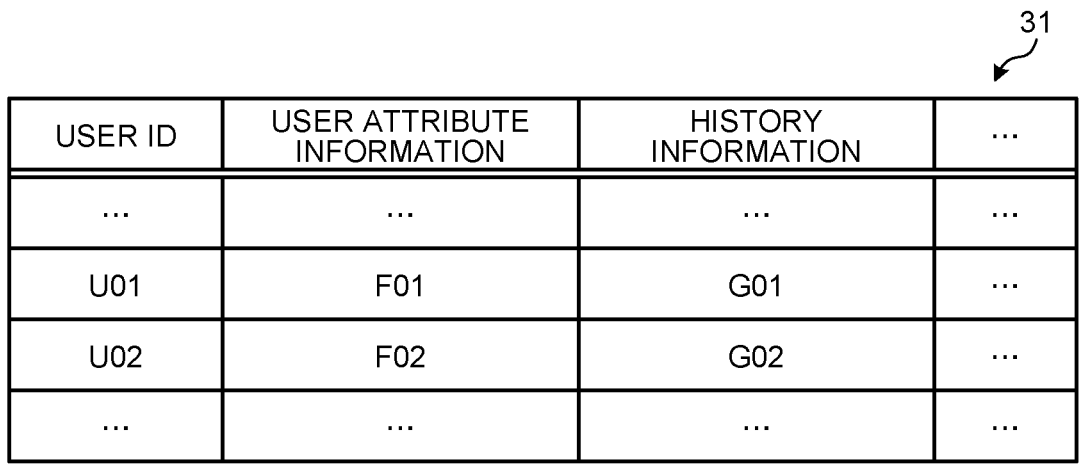
FIG. 3 is a diagram illustrating an example of a user information table according to the embodiment.

The user information table 31 stores information regarding a user who uses the response generation device 10. FIG. 3 illustrates an example of the user information table 31 according to the embodiment. FIG. 3 is a diagram illustrating an example of the user information table 31 according to the embodiment of the present disclosure. In the example illustrated in FIG. 3, the user information table 31 includes items such as "user ID", "user attribute information", and "history information".

The "user ID" indicates identification information for identifying the user. The "user attribute information" indicates, for example, attribute information registered from the user when the response generation device 10 is used, or attribute information of the user estimated by the response generation device 10 using image recognition or voice recognition. In the example illustrated in FIG. 3, the item of the user attribute information is conceptually described as "F01" or the like, but actually, the user attribute information includes attribute information (user profile) such as the age, gender, residence, and family structure of the user. Furthermore, the user attribute information may include, for example, information required for selecting the type of information to be output, such as that the user is visual impaired. For example, in a case where it is registered in the user attribute information that the user is visually impaired, the response generation device 10 may convert the details of the response normally displayed on the screen into a voice and output the voice.

The "history information" indicates a use history of the response generation device 10 by the user. In the example illustrated in FIG. 3, the item of the history information is conceptually described as "G01" or the like, but actually, the history information includes various types of information such as details of a question asked by the user to the response generation device 10, a history of ask-back, a history of an output response, and the like. Furthermore, the history information may include voiceprint information, waveform information, and the like for identifying the user by voice.

Furthermore, the history information may include information regarding a service used by the user via the response generation device 10. The information regarding the service may include, for example, the type of the service used by the user (type such as traffic information service, weather information service, or news service), the number of times of use of the service, the use frequency, and the like. Furthermore, the information regarding the service may include a name of a product purchased by the user in a shopping service, the number of times of purchase and a purchase frequency of the product, a name of a content used by the user in a music distribution service or a moving image service, the number of times of reproduction of the content, a reproduced product, and the like. As described above, the history information may include any information generated when the user uses the response generation device 10.

That is, in the example illustrated in FIG. 3, it is indicated that a user identified by a user ID "U01" has the user attribute information "F01" and the history information "G01".

Next, the response rule table 32 will be described. The response rule table 32 stores an operation command (that is, an operation executed by the response generation device 10 in response generation) for the response generation device 10 and attached information regarding the operation in association with each other.

Figure 4:
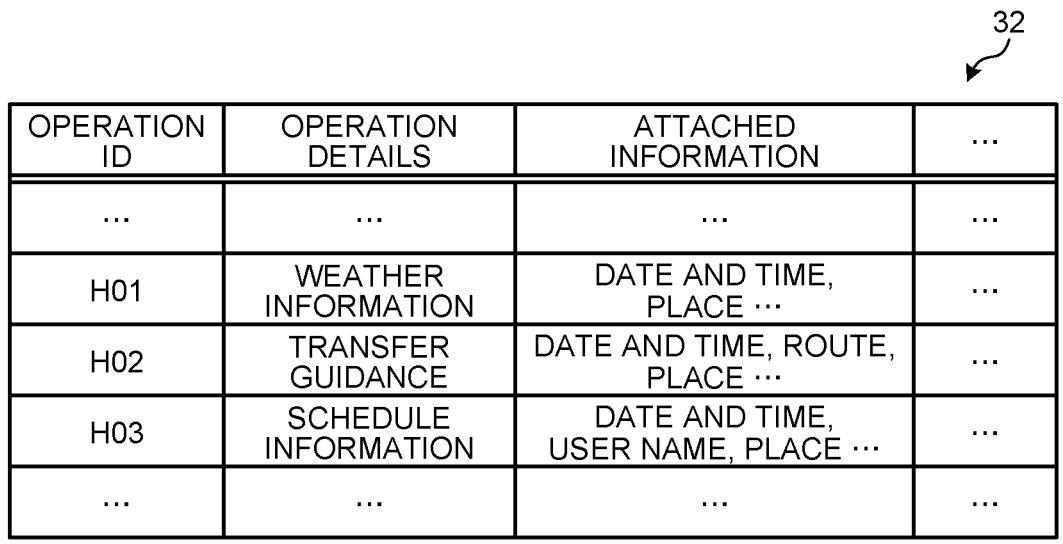
FIG. 4 is a diagram illustrating an example of a response rule table according to the embodiment.

FIG. 4 illustrates an example of the response rule table 32 according to the embodiment. FIG. 4 is a diagram illustrating an example of the response rule table 32 according to the embodiment of the present disclosure. In the example illustrated in FIG. 4, the response rule table 32 includes items such as "operation ID", "operation details", and "attached information".

The "operation ID" indicates identification information for identifying operation. The "operation details" indicates details of an operation executed by the response generation device 10. The "attached information" is information used when a response related to an operation is generated, and is information indicating a target of the operation, information for defining details of the operation in more detail, or the like.

That is, in the example illustrated in FIG. 4, it is indicated that an operation identified by an operation ID "H01" has operation details of "weather information", and its attached information is "date and time" or "place".

Note that, although not illustrated in FIG. 4, the response rule table 32 may store correspondence information between input information and an operation command, such as what operation is selected for what input information.

In general, an operation related to a response is selected on the basis of an element analyzed by semantic analysis processing on input information. As an example, in a case where the input information is an utterance of "Tell me the weather", the agent device determines the utterance as an element of "CHECK-WEATHER". Then, in a case where association is performed that an operation corresponding to the element "CHECK-WEATHER" is "weather information", the agent device determines the operation related to the response on the basis of the association information. Such association information may hold the response rule table 32. Furthermore, such association information may be updated as appropriate by an administrator or the like of the response generation device 10. Furthermore, such association information (response rule) may be set in the response generation device 10 in advance, or may be arbitrarily set by the user.

Figure 5:
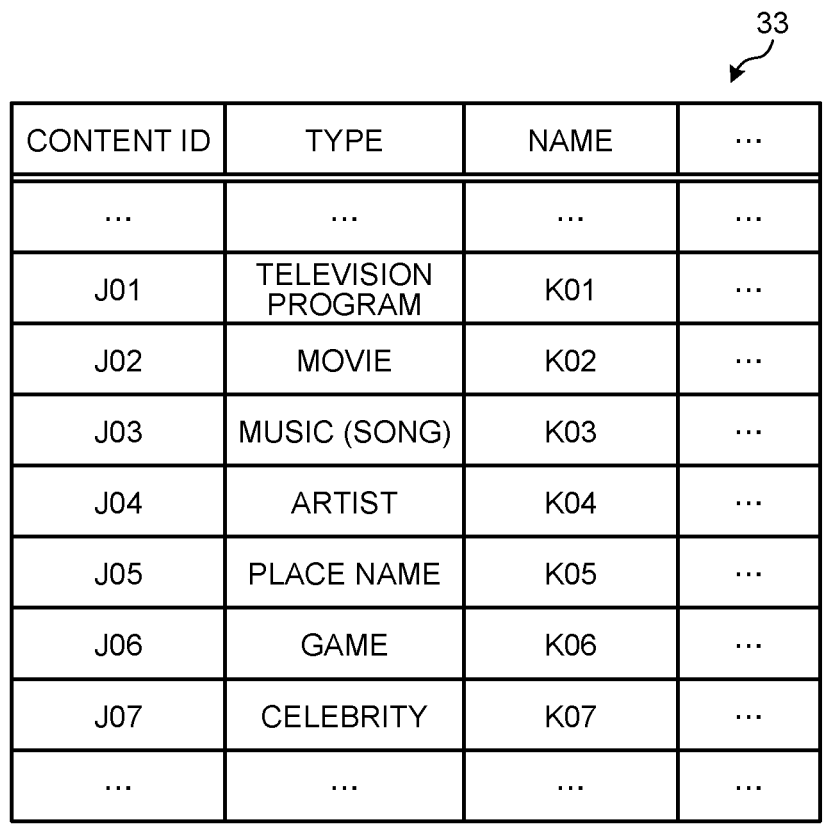
FIG. 5 is a diagram illustrating an example of a content table according to the embodiment.

The content table 33 stores content information that is an example of related information. FIG. 5 illustrates an example of the content table 33 according to the embodiment. FIG. 5 is a diagram illustrating an example of the content table 33 according to the embodiment of the present disclosure. In the example illustrated in FIG. 5, the content table 33 includes items such as "content ID", "type", and "name".

The "content ID" indicates identification information for identifying content. The "type" indicates a type of the content. The "name" indicates a name of the content. In the example illustrated in FIG. 5, the item of the name is conceptually described as "K01" or the like, but actually, a character string indicating a specific content name is stored in the item of the name.

That is, in the example illustrated in FIG. 5, it is indicated that a content identified by a content ID "J01" has a type of "television program" and the name of "K01".

Note that, although not illustrated in FIG. 5, the content table 33 may store not only the name of the content but also various types of information regarding the content. For example, the content table 33 may store a creator, a director, and a performer of the content, a country and a place where the content is created, a genre and details of the content, and the like. Furthermore, the content table 33 may store a familiarity, popularity, and the like of each content. The familiarity and popularity of the content are calculated on the basis of, for example, information such as the number of times of reproduction, the number of times of access, the number of times of search, and sales of the content. Furthermore, the content table 33 is not necessarily held by the response generation device 10, and may be held in a distributed manner by each server or the like that stores information regarding the content. In this case, the response generation device 10 may access each server to collect the information regarding the content at a timing of collecting the related information.

Returning to FIG. 2, the description will be continued. The acquisition unit 40 and the response generation unit 50 are processing units that execute information processing executed by the response generation device 10. The acquisition unit 40 and the response generation unit 50 are implemented by, for example, a central processing unit (CPU), a micro processing unit (MPU), a graphics processing unit (GPU), or the like executing a program (for example, a response generation program for executing response generation processing according to the present disclosure) stored in the response generation device 10 with a random access memory (RAM) or the like as a work area. Furthermore, the acquisition unit 40 and the response generation unit 50 are controllers, and may be implemented by, for example, an integrated circuit such as an application specific integrated circuit (ASIC) or a field programmable gate array (FPGA).

The acquisition unit 40 is a processing unit that acquires various types of information. As illustrated in FIG. 2, the acquisition unit 40 includes a detection unit 41, a registration unit 42, and a reception unit 43.

The detection unit 41 detects various types of information via the sensor 20. For example, the detection unit 41 detects a voice uttered by the user via a microphone that is an example of the sensor 20. Furthermore, the detection unit 41 may detect various types of information regarding the motion of the user, such as the face information of the user, the orientation, inclination, movement, moving speed, and the like of the body of the user, via a camera, an acceleration sensor, an infrared sensor, or the like. That is, the detection unit 41 may detect various physical quantities such as position information, acceleration, temperature, gravity, rotation (angular velocity), illuminance, geomagnetism, pressure, proximity, humidity, and rotation vector as context information via the sensor 20.

The registration unit 42 receives registration from the user via the input unit 21. For example, the registration unit 42 receives registration of the user profile (attribute information) of the user who uses the response generation device 10 via the touch panel or the keyboard.

Furthermore, the registration unit 42 may register, in the storage unit 30, various types of information such as a response rule used for interactive processing with the user and information regarding the content. For example, the registration unit 42 acquires the response rule and the information regarding the content via a cloud server or the like that controls the interactive processing of the response generation device 10, and registers the acquired information.

Furthermore, the registration unit 42 may receive registration of a schedule of the user, or the like. For example, the registration unit 42 receives schedule registration from the user by using an application function incorporated in the response generation device 10. For example, the registration unit 42 registers the schedule information such as a plan of outing in the storage unit 30 through interaction with the user.

The reception unit 43 receives various types of information. For example, the reception unit 43 receives date and time information used for the interactive processing, position information of a current position in which the response generation device 10 is, and the like from the external server 200 or the like. Furthermore, in a case where the attribute information and the schedule information of the user are registered not in the response generation device 10 but in an external service or the like, the reception unit 43 receives the attribute information, the schedule, and the like of the user from the external server 200.

Furthermore, the reception unit 43 may receive context information regarding communication. For example, the reception unit 43 may receive a connection status between the response generation device 10 and various devices (a server on a network, a home appliance in home, and the like) as context information. The connection status with various devices is, for example, information indicating whether or not mutual communication is established, a communication standard used for communication, or the like.

The acquisition unit 40 acquires various types of information by controlling the above processing units. For example, the acquisition unit 40 acquires the input information serving as a trigger for generating the response to the user.

For example, the acquisition unit 40 acquires voice information uttered by the user as the input information. Specifically, the acquisition unit 40 acquires an utterance of the user such as "train" or "tomorrow", and acquires a character string (text information) included in the utterance, or some intention included in the utterance as the input information. Note that, the acquisition unit 40 may acquire not only the utterance of the user but also a character string (text data) input by the user.

Alternatively, the acquisition unit 40 may acquire detection information obtained by detecting an action of the user, as the input information. The detection information is information detected by the detection unit 41 via the sensor 20. Specifically, the detection information is an action of the user that can be a trigger for the response generation device 10 to generate the response, such as information indicating that the user has looked at the camera of the response generation device 10, information indicating that the user has moved from a room at home to the entrance, a gesture of the user performed together with the utterance, and the like.

For example, the acquisition unit 40 may acquire information input from the user in the past before the input information, details of a response output to the user in the past, or the like. That is, the acquisition unit 40 acquires details of the past interaction with the user, the past response generated for the user, and the like. Furthermore, the acquisition unit 40 may acquire a use history or the like of the service used by the user through the interactive processing.

Furthermore, the acquisition unit 40 may acquire context information when the input information is input, together with the input information.

For example, the acquisition unit 40 may acquire a place in which the user is, a date and time when the input information is input to the response generation device 10, attribute information of the user, and the like as the context information.

Furthermore, the acquisition unit 40 may acquire information such as the number of other users being near the user, a location, a category of the location (home, outdoors, or the like), a vehicle (train, subway, Shinkansen, packed train (degree of congestion), automobile, ship, airplane) on which the user rides, or the like. The acquisition unit 40 acquires these pieces of information by using, for example, a voice recognition model or the like that determines background noise or the like in a vehicle on which the user rides. Alternatively, the acquisition unit 40 may acquire these pieces of information on the basis of position information or the like acquired from a terminal used by the user.

Furthermore, the acquisition unit 40 may acquire attribute information such as age, gender, and the like of the user (speaker). For example, the acquisition unit 40 may acquire the attribute information of the user registered in advance by the user. The acquisition unit 40 acquires, for example, information such as gender, age, and residence of the user. Note that, the acquisition unit 40 may acquire the attribute information of the user by recognizing an image captured by the sensor 20.

Furthermore, the acquisition unit 40 may acquire an action state of the user. The action state of the user is information indicating a state such as whether the user is standing or sitting, sleeping, walking or running, or making a call or talking with another user. Furthermore, the acquisition unit 40 may acquire various types of information such as a health status of the user and whether or not the user who has uttered is a user registered in the response generation device 10.

Note that, the context information described above is an example, and any information indicating a situation in which the user or the response generation device 10 is placed can be context information. For example, the acquisition unit 40 may acquire, as context information, various physical quantities such as position information, acceleration, temperature, gravity, rotation (angular velocity), illuminance, geomagnetism, pressure, proximity, humidity, and rotation vector of the response generation device 10 acquired via the sensor 20. Furthermore, the acquisition unit 40 may acquire, as the context information, a connection status or the like (for example, information regarding establishment of communication or a communication standard used) with various devices by using a built-in communication function.

Furthermore, the context information may include information regarding an interaction between the user and another user, or between the user and the response generation device 10. For example, the context information may include interactive context information indicating context of an interaction performed by the user, a domain of the interaction (weather, news, train operation information, and the like), intention and attribute information of the user utterance, and the like.

Furthermore, the context information may include date and time information when the interaction is performed. Specifically, the date and time information is information such as a date, time, day of the week, holiday characteristic (such as Christmas), and time zone (morning, daytime, night, midnight).

Furthermore, the context information may include information such as a position or a situation in which the user is. Specifically, the information indicating the position in which the user is, is information indicating a location of the user, such as whether the user is in a living room, a bedroom, or a child's room in home. Alternatively, the information indicating the position in which the user is may include information on a specific place indicating an outing destination of the user.

Furthermore, the acquisition unit 40 may acquire, as the context information, various types of information indicating the situation of the user, such as information regarding specific housework being performed by the user, details of a television program being viewed by the user, information indicating what the user is eating, and that the user has a conversation with a specific person.

Furthermore, the acquisition unit 40 may acquire information such as which home appliance is active (for example, whether the power is on or off) and which home appliance is executing what kind of processing, by mutual communication with a home appliance (IoT device or the like) placed in home.

Furthermore, the acquisition unit 40 may acquire traffic conditions, weather information, and the like in the user's living area as context information by mutual communication with an external service. The acquisition unit 40 stores each piece of information acquired in the storage unit 30. Furthermore, the acquisition unit 40 may refer to the storage unit 30 and appropriately acquire information required for processing.

Next, the response generation unit 50 will be described. As illustrated in FIG. 2, the response generation unit 50 includes a signal processing unit 51, a voice recognition unit 52, an analysis unit 53, a response unit 54, and a transmission unit 55. The response generation unit 50 generates a response to the user by using the related information related to the input information in a case where it is determined that the response to the user cannot be generated on the basis of only the input information, by controlling the above processing units.

The signal processing unit 51 performs signal processing related to the input information such as the utterance of the user. Specifically, the signal processing unit 51 converts the voice received from the user into a voice signal in a mode in which information processing in the subsequent stage can be executed. Alternatively, the signal processing unit 51 converts the image captured by the sensor 20 into digital data in a mode in which information processing in the subsequent stage can be executed.

The voice recognition unit 52 recognizes the signal processed by the signal processing unit 51 as a voice. For example, the voice recognition unit 52 performs automatic speech recognition (ASR) processing and natural language understanding (NLU) processing to recognize the activation word in the response generation device 10, performs sound source separation processing of utterance and environmental sound, and performs noise reduction processing.

The analysis unit 53 analyzes the voice information recognized by the voice recognition unit 52. For example, the analysis unit 53 analyzes a meaning of the voice recognized by the voice recognition unit 52. Furthermore, the analysis unit 53 determines whether the voice recognized by the voice recognition unit 52 is a complete utterance or an incomplete utterance.

The response unit 54 generates a response to the input information on the basis of the information analyzed by the analysis unit 53. For example, the response unit 54 refers to the user information table 31 and the response rule table 32, and generates a response corresponding to the input information on the basis of the meaning of a word included in the input information and the analysis result of the input information.

Furthermore, the response unit 54 generates a response to the input information depending on the meaning of the input information analyzed by the analysis unit 53. At this time, the response unit 54 may use various known technologies such as phrase extraction and slot analysis in the interaction, for example.

The transmission unit 55 controls output of the response generated by the response unit 54. For example, the transmission unit 55 converts the response including a character string generated by the response unit 54 into voice data. Alternatively, the transmission unit 55 converts the response accompanied by image information generated by the response unit 54 into image data. Then, the transmission unit 55 transmits the converted data to the output unit 60.

Furthermore, the transmission unit 55 may transmit information such as the information used for response generation and the user's reaction to the response to the external server 200, a business operator providing various services, or the like.

The output unit 60 is a mechanism for outputting various types of information. For example, the output unit 60 is a speaker or a display. For example, the output unit 60 performs voice output of the voice data generated by the response unit 54. Furthermore, the output unit 60 outputs the image data generated by the response unit 54 to the display. Note that, the output unit 60 may output the response in various modes such as performing character recognition of the voice data generated by the response unit 54 to display the data on the display.

The response generation unit 50 generates a response corresponding to the input information by controlling the above processing units. That is, in a case where it is determined that the response to the user cannot be generated on the basis of only the input information, the response generation unit 50 generates the response to the user by using the related information related to the input information.

Specifically, the response generation unit 50 generates a response to the user by using the related information in a case where an operation command that is information for specifying the details of the response to the user cannot be determined only from the input information.

Alternatively, in a case where the operation command can be determined only from the input information and the attached information that is the information used for generating the response corresponding to the operation command cannot be determined only from the input information, the response generation unit 50 may generate the response to the user by using the related information.

Here, determination processing of the operation command and the attached information will be described. For example, the response generation unit 50 distinguishes between a complete utterance and an incomplete utterance on the basis of a viewpoint whether or not an operation command and attached information are extracted from input information such as an utterance of the user to the minimum extent that a response can be generated.

In a case where it is determined that the utterance of the user is a complete utterance, the response generation unit 50 performs utterance analysis as the complete utterance and generates a response to the user. In the present disclosure, the complete utterance refers to an utterance in which at least an operation command and attached information are included to the minimum extent that a response can be generated. For example, in a case where the user utters "Set an alarm", the response generation unit 50 determines the operation command as "alarm setting" on the basis of the response rule. Furthermore, the response generation unit 50 determines that the utterance of "Set an alarm" does not include the attached information. In this case, the response generation unit 50 determines that the utterance "Set an alarm" of the user is an incomplete utterance.

Note that, even if the utterance includes the operation command and the attached information, the response generation unit 50 may determine that the utterance is an incomplete utterance depending on the operation command even in a case where the attached information exists. For example, in a case where the user utters "Tell me tomorrow's weather", the response generation unit 50 determines the operation command as "weather information" on the basis of the response rule. Furthermore, the response generation unit 50 determines that "time information" of "tomorrow" is included in the utterance of "Tell me tomorrow's weather". However, since the utterance does not include place information, the response generation unit 50 may determine the utterance as an incomplete utterance. Note that, for example, in a case where initial setting or the like regarding weather information is performed by the user (or example, setting such that the place of the weather information is always "Tokyo"), the response generation unit 50 may determine the utterance as a complete utterance. That is, the attached information also includes information that is optional or can be complemented in execution of the operation. For example, in a case where the user utters "Tell me tomorrow's weather", the time information and the place information are not necessarily required, or are information complemented from the user's setting and context information (for example, "time information" can be complemented as "today", and "place information" can be complemented as "present location").

Note that, when detecting an incomplete utterance, the response generation unit 50 may make a response to prompt the user to make a complete utterance. Alternatively, the response generation unit 50 can also perform semantic analysis processing or the like in the subsequent stage on the assumption that there is a possibility of both incomplete and complete utterance of the user.

Hereinafter, a description will be given of a type of processing for generating a response on the basis of related information in a case where the response generation unit 50 determines the utterance of the user as an incomplete utterance.

For example, there is a case where the response generation unit 50 extracts a part of the operation command from the utterance of the user, and determines that details of a specific operation is unknown although a desired operation of the user is recognized. It is assumed that the response generation unit 50 recognizes only a character string "deletion" in the utterance of the user and does not recognize other information.

In this case, the response generation unit 50 extracts an operation target candidate as the related information. For example, the response generation unit 50 refers to the response rule table 32 and extracts all operation commands related to "deletion". Specifically, the response generation unit 50 extracts an item including "deletion" in the operation command, such as "deletion of alarm setting" or "deletion of schedule information".

Then, the response generation unit 50 selects an operation detail having a high likelihood of being an operation desired by the user among the extracted operations on the basis of, for example, the latest interaction history with the user. Then, the response generation unit 50 generates a response on the basis of the selected operation detail. For example, it is assumed that the response generation unit 50 has received alarm setting from the user several minutes ago. In this case, the response generation unit 50 determines that there is a high possibility that the user issues a command related to the latest operation, and outputs a response such as "The alarm set earlier will be deleted" to the user.

Furthermore, as another example, it is assumed that the response generation unit 50 recognizes only a character string "reproduce" in the utterance of the user and does not recognize other information.

Also in this case, the response generation unit 50 extracts an operation target candidate as the related information. For example, the response generation unit 50 refers to the response rule table 32 and extracts all operation commands related to "reproduction". Specifically, the response generation unit 50 extracts an item including "reproduction" in the operation command, such as "reproduction of music" or "reproduction of a moving image". Then, the response generation unit 50 generates a response related to an operation assumed to be desired by the user on the basis of an action history of the user so far (for example, the number of times of moving image reproduction is larger than the number of times of music).

Alternatively, it is assumed that the response generation unit 50 recognizes only character strings "confirm" and "Tell me" in the utterance of the user and does not recognize other information. In this case, the response generation unit 50 extracts all the operation commands to which a concept "CHECK" is set. Then, the response generation unit 50 generates, for example, a response that enumerates, as candidates, services and the like including the concept "CHECK" such as weather information and traffic information.

Note that, the response generation unit 50 can respond similarly to the above, for example, even in a case where the utterance of the user starts with an interrogative. For example, it is assumed that the response generation unit 50 recognizes only a character string "when" or "where" in the utterance of the user and does not recognize other information. In this case, the response generation unit 50 generates, for example, a response that enumerates, as candidates, services and the like including concepts such as "when" and "where" in the operation.

Furthermore, the response generation unit 50 may determine that the operation command is unknown although only the attached information can be partially extracted from the utterance of the user.

In this case, the response generation unit 50 may generate a response to the user by using, for example, context information that is information indicating a situation at a time-point when the input information is acquired, as the related information.

Specifically, the response generation unit 50 generates a response to the user by using the attribute information or the location information of the user as the context information.

It is assumed that the response generation unit 50 recognizes only a character string "tomorrow's" in the utterance of the user and does not recognize other information. In this case, the response generation unit 50 refers to the response rule table 32 and extracts all the operation details of which date and time information is included in the attached information. For example, in the example illustrated in FIG. 4, "weather information", "transfer guidance", and "schedule information" as the operation details include "date and time" as the attached information. The response generation unit 50 extracts all these operation details.

Then, the response generation unit 50 selects an operation detail with high likelihood desired by the user on the basis of the past interaction with the user, or the like. For example, in a case where the user has had a conversation related to outing, or the like immediately before, the response generation unit 50 determines that the user is likely to issue an operation command of "I want to know tomorrow's weather information", and generates tomorrow's "weather information" as a response. Alternatively, the response generation unit 50 may generate a response that presents a plurality of operation commands that can be response candidates to the user. For example, the response generation unit 50 may generate a response for determining the operation command such as "Do you want to confirm tomorrow's weather or confirm tomorrow's schedule?".

Furthermore, the response generation unit 50 may not be able to extract clear information such as an operation command and attached information from the utterance of the user.

In such a case, the response generation unit 50 may generate a response to the user by using information on a content related to the character string corresponding to the input information as the related information.

Specifically, the response generation unit 50 refers to the content table 33 and generates a response to the user on the basis of the name of the content including the character string corresponding to the input information. Note that, the response generation unit 50 may generate a response to the user on the basis of not only the name of the content but also the creator of the content, details of the content, and the like.

It is assumed that the response generation unit 50 recognizes only a character string "tomorrow's" in the utterance of the user and does not recognize other information. In this case, the response generation unit 50 refers to the content table 33 and extracts all contents including the character string "tomorrow's".

Then, the response generation unit 50 generates a response to the user by combining the extracted content and an operation related to the content. The operation related to the content is, for example, reproduction of music, reproduction of a moving image, or the like. That is, the response generation unit 50 generates reproduction of a song having a title including "tomorrow's", reproduction of a moving image having a title including "tomorrow's", or the like as a response to the user. For example, as illustrated in FIG. 1, the response generation unit 50 may present a content name as a reproduction candidate to the user.

Note that, the response generation unit 50 may extract a content as a candidate on the basis of familiarity or the like of the content. For example, even if the utterance of the user and the name of the content are matched, in a case where the familiarity of the content is low, it is highly probable that the matching is by chance. For this reason, in a case where the familiarity to the user is less than or equal to a predetermined threshold value, the response generation unit 50 may perform processing of not generating an operation such as reproduction of the content as a response even if the utterance of the user and the name of the content match.

Furthermore, in a case where the user can be specified by voice recognition or image recognition, the response generation unit 50 may refer to the interaction history of the user and perform processing according to a pronunciation or wording habit of the user. For example, with respect to the utterance of "tomorrow's", whether the user utters "ASHITA (tomorrow)" or "ASU (tomorrow)" on a daily basis may be different depending on the user. Under this situation, it is assumed that the response generation unit 50 recognizes that the user has uttered "ASU (tomorrow)" even though the user regularly utters "ASHITA (tomorrow)" as "tomorrow" when "change of tomorrow's schedule" or the like is requested. In this case, the response generation unit 50 determines that the utterance does not have an intention of "change of tomorrow's schedule" or the like but has a high possibility of being a content (that is, a certain proper noun) including a character string "ASU (tomorrow)". Then, the response generation unit 50 generates a response related to an operation of using "tomorrow" as a proper noun, such as "reproduce a song of "tomorrow's (ASHITA's) . . . ", instead of a response related to an operation of using "tomorrow" as the attached information (date and time information), such as "Is it a change of tomorrow's schedule?". As described above, the response generation unit 50 can generate a response by comprehensively determining an appropriate response to the user by using information such as daily wording of the user.

Furthermore, in a case where clear information such as the operation command or attached information cannot be extracted from the utterance of the user, the response generation unit 50 may estimate the operation command or the attached information on the basis of the action history of the user, or the like.

For example, the response generation unit 50 may generate a response to the user by using schedule information of the user as the context information.

It is assumed that the response generation unit 50 recognizes only a character string "tomorrow's" in the utterance of the user and does not recognize other information. In this case, the response generation unit 50 refers to the user information table 31 and acquires schedule information (such as registration of a schedule) of the user. Furthermore, the response generation unit 50 refers to the response rule table 32 and extracts an operation command including time information among the operation commands.

The response generation unit 50 further extracts an operation related to the schedule information or the like registered by the user from among extracted operation candidates. For example, in a case where setting of an alarm driven in tomorrow morning is performed in an application or an external service activated by the user, the response generation unit 50 extracts operations such as "confirmation of alarm setting" and "deletion of alarm". Then, the response generation unit 50 calculates priority of an operation estimated to be related to, high, and generates a response that presents the operation to the user. Specifically, the response generation unit 50 generates a response such as "The alarm is set for seven o'clock tomorrow" or "Do you want to cancel the tomorrow's alarm setting?". As described above, the response generation unit 50 determines the priority of the operation desired by the user by using the schedule information of the user, thereby being able to generate a response by comprehensively determining an appropriate response to the user.

Furthermore, the response generation unit 50 may generate a response to the user by using an interaction history with the user before the input information is acquired, as the related information. In this case, the response generation unit 50 specifies a user who has made the utterance by voice recognition or image recognition, and refers to the user information table 31 to refer to the interaction history of the user who has made the utterance.

In this case, the response generation unit 50 may refer to the use history of the service by the user as the interaction history. That is, the response generation unit 50 may generate a response to the user by using the use history of the service of the user before the input information is acquired.

It is assumed that the response generation unit 50 recognizes only a character string "train" in the utterance of the user and does not recognize other information. In this case, the response generation unit 50 refers to the user information table 31 to refer to the use history of the service of the user. Furthermore, the response generation unit 50 refers to the response rule table 32 and extracts an operation command (for example, transfer guidance or the like) in which a target such as a vehicle is included in the attached information, among the operation commands.

For example, it is assumed that there is a log in which the user who has made the utterance habitually uses the transfer guidance service in a morning time zone, in the use history of the service of the user. In this case, the response generation unit 50 preferentially selects the transfer guidance among the extracted operation commands. Then, the response generation unit 50 refers to context information such as date and time information, and generates a response related to the transfer guidance to the user on the basis of a current time and a route habitually searched. As a result, the user can receive the response related to the transfer guidance with only fragmentary information "train".

Alternatively, it is assumed that there is a log in which the user who has made the utterance habitually uses a moving image distribution service related to a moving image in which the train is a subject, in the use history of the service of the user. In this case, the response generation unit 50 preferentially selects moving image reproduction among the extracted operation commands. Then, the response generation unit 50 generates a response related to moving image reproduction to the user on the basis of a moving image that is habitually reproduced. As a result, the user can execute moving image reproduction with only fragmentary information of "train".

At this time, the response generation unit 50 may select an operation command on the basis of context information of the user. For example, it is assumed that a certain user tends to utter an operation command related to transfer guidance during outing, and tends to utter an operation command related to moving image reproduction at home. In this case, in a case where an utterance of "train" is received from the user, the response generation unit 50 may perform either operation of transfer guidance or moving image reproduction in accordance with current context information of the user.

Furthermore, the response generation unit 50 may select an operation command with reference to not only the location of the user but also a surrounding environment as the context information. For example, it is assumed that, in a case where the user utters only "Put it out", the response generation unit 50 determines that the user desires "moving image reproduction" from the above-described various types of information. At this time, the response generation unit 50 refers to the user's surrounding environment by using a camera or the like, and recognizes that a person other than a family member is present around the user. In this case, since the person other than the family member is present around the user, the response generation unit 50 may generate a response for a question such as "Is it OK to perform moving image reproduction?" instead of immediately performing the moving image reproduction.

Furthermore, as another example, the response generation unit 50 may refer to a purchase history for each user as the use history of the service. For example, it is assumed that there are many logs of purchasing a product "tomorrow's XXX" by a user who has made the utterance of "tomorrow's". In this case, the response generation unit 50 may determine that the user desires to purchase a product "tomorrow's XXX" again and generate a response such as "Would you like to order "tomorrow's XXX"?".

In the above example, the response generation unit 50 may specify an attribute of the user who has made the utterance and perform processing according to the attribute. For example, it is assumed that the user is a child and is a user who is not authorized to make purchase via the response generation device 10. In this case, even if the user utters "tomorrow's", the response generation device 10 does not cause an operation of "purchasing a product "tomorrow's XXX" " from the utterance. For example, the response generation device 10 presents candidates for an operation other than purchase (for example, reproduction of content having a name including "tomorrow's", and the like) to the user.

Examples of various types of response generation by the response generation unit 50 have been described above; however, the response generation unit 50 may generate a plurality of responses to the user by using the related information and present the plurality of responses to the user with a priority order.

For example, the response generation unit 50 performs comprehensive determination on a response candidate to be output to the user, and scores the priority. Then, the response generation unit 50 presents top N (N is an arbitrary number) responses to the user. For example, as illustrated in FIG. 1, the response generation unit 50 may present the response to the user in various modes such as performing voice output of the uppermost response and outputting the remaining response candidates to the display.

Furthermore, in the various types of response generation by the response generation unit 50 described above, the response generation unit 50 may perform learning on the basis of the user's reaction. For example, in a case where the user continues an interaction with a response without any particular problem with respect to the response generated only from the utterance of "tomorrow's", the response generation unit 50 determines the response as "positive example". Alternatively, in a case where the user indicates a rejection response to the response generated only from the utterance of "tomorrow's" (a case where an utterance related to denial is made such as "No, it is not" or "It is not like that", or the like), the response generation unit 50 determines the response as "negative example". Then, the response generation unit 50 learns so that the score (priority) calculated for the response is high or low. As a result, the response generation unit 50 can accurately estimate the operation desired by the user as the interaction with the user is repeated.

Note that, rule-based processing based on each data table stored in the storage unit 30 has been described as the various types of response generation by the response generation unit 50; however, the response generation processing by the response generation unit 50 may be executed by End-to-End processing.

Figure 6:
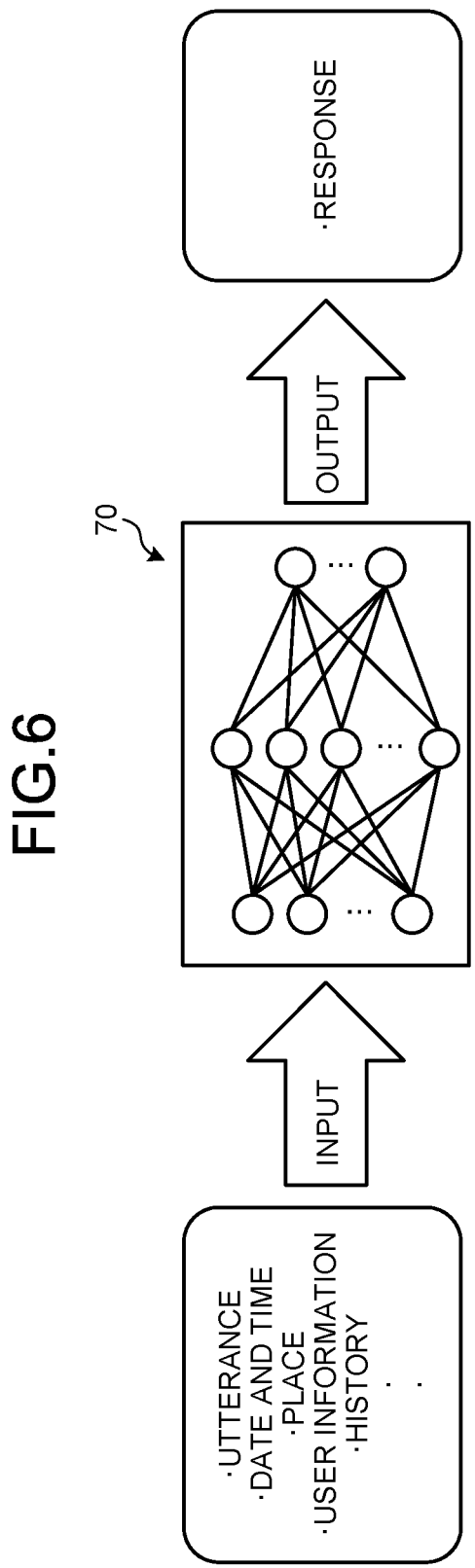
FIG. 6 is a diagram conceptually illustrating an example of response generation processing according to the embodiment.

This point will be described with reference to FIG. 6. FIG. 6 is a diagram conceptually illustrating an example of the response generation processing according to the embodiment. In the example of FIG. 6, the response generation unit 50 generates a response by using a learned model 70 learned by a deep neural network (DNN) or the like.

For example, the learned model 70 is learned by using context information such as a date and time and a place where the utterance is made, attribute information of the user, an interaction history with the user and an action history, and the like as inputs together with the utterance of the user, and using a response to the utterance as a positive example or a negative example. Note that, as learning data, data labeled with a positive example or a negative example in advance may be used, or a positive example or a negative example may be appropriately determined on the basis of a reaction from the user.

The response generation unit 50 performs response generation processing by using the learned model 70 learned in learning processing described above. For example, in a case where the utterance of the user is acquired, the response generation unit 50 inputs context information such as a date and time and a place, attribute information of the user, an interaction history with the user and an action history, and the like to the learned model 70 together with the utterance. Then, the response generation unit 50 outputs a response to the user generated by the learned model 70. As described above, the response generation unit 50 may generate a response to the user by End-to-End processing not by the rule-based processing.

[1-3. Procedure of Information Processing According to Embodiment]

Figure 7:
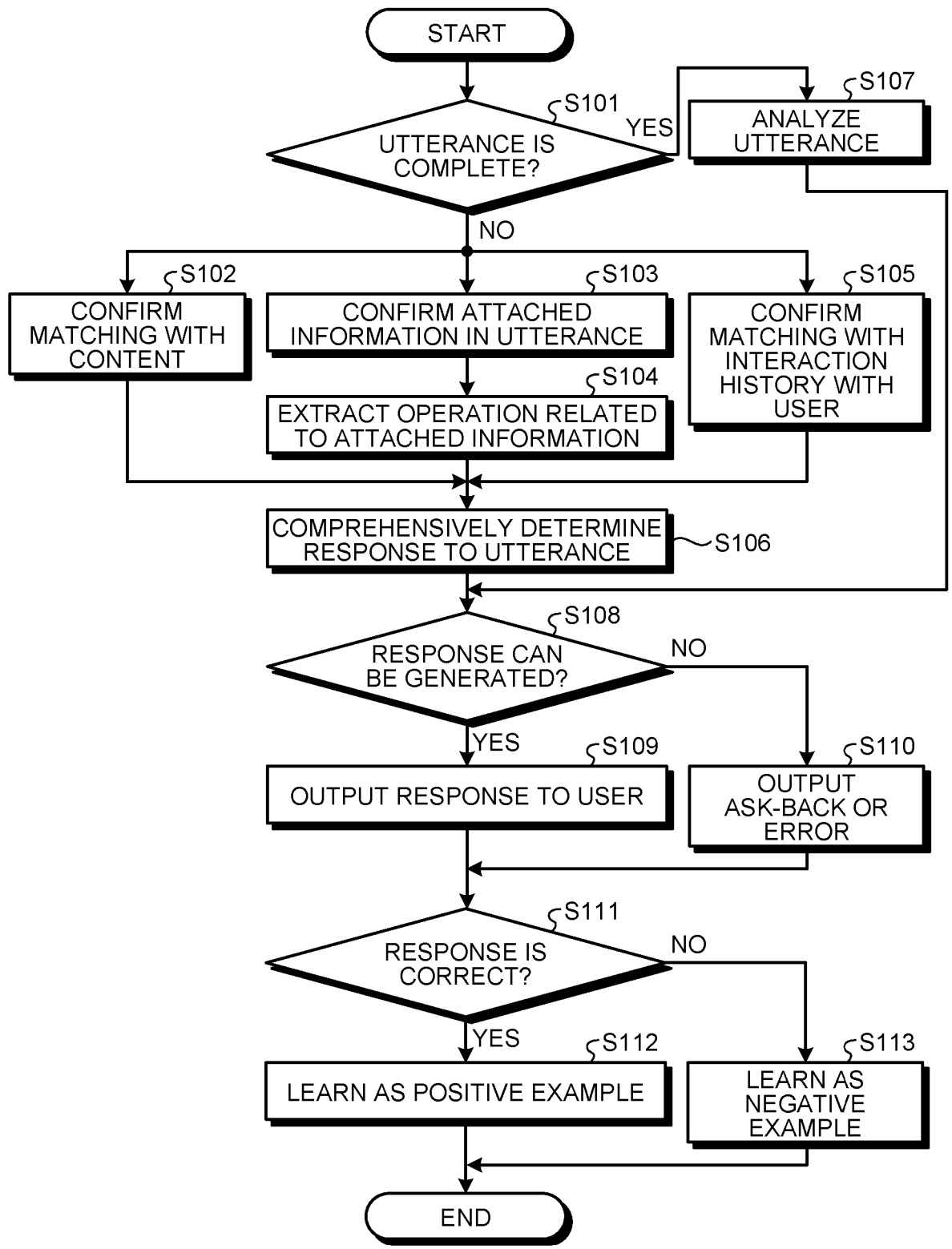
FIG. 7 is a first flowchart illustrating a flow of processing according to the embodiment.

Next, a procedure of the information processing according to the embodiment will be described with reference to FIG. 7. FIG. 7 is a flowchart illustrating a flow of the processing according to the embodiment.

As illustrated in FIG. 7, the response generation device 10 determines whether or not the utterance acquired from the user is a complete utterance (step S101). In a case where the utterance is not a complete utterance (step S101; No), the response generation device 10 executes each piece of processing for the incomplete utterance as described below.

For example, the response generation device 10 confirms matching between the utterance and the content (step S102). For example, the response generation device 10 enumerates contents including a character string included in the utterance, and extracts operation commands, attached information, and the like related to these contents.

Furthermore, the response generation device 10 confirms attached information in the utterance (step S103). For example, the response generation device 10 confirms information that can be the attached information of the operation although the operation command cannot be specified only by the utterance of the user, such as "tomorrow".

Subsequently, the response generation device 10 extracts an operation related to the attached information (step S104). For example, the response generation device 10 extracts an operation having date and time information of "tomorrow" as the attached information.

Furthermore, the response generation device 10 confirms matching with the interaction history with the user (step S105). For example, the response generation device 10 performs collation with a product including a character string "tomorrow" and purchased by the user in the past in the interactive processing, on the basis of the utterance "tomorrow". Then, the response generation device 10 performs processing of extracting "purchase" as the operation desired by the user who has uttered, on the basis of a log that the user has purchased a product including the character string "tomorrow" in the past.

The response generation device 10 comprehensively determines a response to the utterance through processing such as step S102 to step S105 (step S106). For example, the response generation device 10 determines "an operation estimated to be desired by the user in the incomplete utterance" on the basis of the priority (score) of each of the extracted operations.

Note that, in a case where the utterance is a complete utterance (step S101; Yes), the response generation device 10 skips the processing in step S102 and the like, and analyzes the complete utterance (step S107). Note that, the response generation device 10 may execute the processing of steps S102 to S105 and the like without skipping the processing even in a case where the utterance is a complete utterance.

Then, the response generation device 10 determines whether or not a response to the user can be generated on the basis of the estimated operation or the like (step S108). For example, if the response generation device 10 can generate the response on the basis of the estimated operation or the like (step S108; Yes), the response is generated, and the generated response is output to the user (step S109). On the other hand, in a case where the response cannot be generated on the basis of the estimated operation or the like (step S108; No), for example, in a case where it is determined that an appropriate response cannot be generated due to insufficient attached information or the like even if the operation is estimated, the response generation device 10 outputs askback or an error (step S110).

Thereafter, the response generation device 10 determines whether or not the response (or response such as ask-back) output to the user is correct (step S111). For example, in a case where it is determined that the response is correct, for example, in a case where the user has accepted the response (step S111; Yes), the response generation device 10 learns the response as a positive example (step S112). On the other hand, in a case where it is determined that the response is incorrect, for example, the user has refused the response or has made a request utterance again (step S111; No), the response generation device 10 learns the response as a negative example (step S113).

[1-4. Modification According to Embodiment]

The response generation processing according to the embodiment described above may be variously modified. Hereinafter, modifications of the embodiment will be described.

[1-4-1. Gesture Information]

In the above embodiment, an example has been described in which the response generation device 10 acquires the utterance of the user as the input information. At this time, the response generation device 10 may acquire information regarding a gesture such as a motion or a body gesture or hand gesture of the user as the related information of the utterance of the user.

Furthermore, the response generation device 10 may generate a response to the user by combining the acquired gesture and utterance. It is assumed that the response generation device 10 has recognized a character string "Quiet" in the utterance of the user. In this case, there is a case where the response generation device 10 cannot specify an operation as to whether the user intends to transmit an email or make a phone call to a person named "quiet", for example, or whether the user intends to lower the volume of a song being reproduced by the response generation device 10.

Here, it is assumed that the response generation device 10 detects a gesture in which the user puts the index finger on the mouth together with the utterance of the user. In this case, the response generation device 10 analyzes that the user's gesture includes "intention to suppress some sound" from the image recognition result of the detected gesture. The response generation device 10 comprehensively determines these pieces of information, and determines that the above utterance indicates the intention of the user to "lower the volume of the song being reproduced".

As described above, in a case where the voice information is the input information, the response generation device 10 may use detection information obtained by detecting a gesture or the like of the user as the related information. As a result, the response generation device 10 can accurately estimate the user's intention by capturing the user's action even in a case where it is difficult to specify the user's intention only with utterance.

[1-4-2. Activation Word]

In the above embodiment, processing has been described in which the response generation device 10 comprehensively determines an operation desired by the user and generates a response to the user. Here, the response generation device 10 does not necessarily generate a response to the user, and may perform setting to meet the user's request by comprehensively determining the operation desired by the user.

For example, the response generation device 10 may change the setting serving as a trigger for activating the interactive processing on the basis of the fragmentary input information acquired from the user. For example, it is assumed that an activation word for activating an interaction function of the response generation device 10 is a specific word such as "hello". However, there are cases where the user forgets "hello" that is the activation word or cannot utter the activation word in the case of an immediate moment.

In this case, it is assumed that the response generation device 10 acquires an action of the user such as that the user who is in front of the response generation device 10 frequently makes an utterance that is not an activation word, such as "Let me see" or "What is it?". In such a case, the response generation device 10 may determine whether or not the action of the user satisfies a predetermined condition, and change the activation word depending on the action of the user.

For example, before the user utters the activation word, the response generation device 10 determines whether or not the same details have been uttered from the user a predetermined number of times or more. Then, in a case where it is determined that the same details have been uttered the predetermined number of times or more, the response generation device 10 determines that the user desires to activate the response generation device 10 with the utterance, and changes the activation word.

As described above, the response generation device 10 can set, as the activation word, a word by which the interactive processing is not normally activated, such as "Let me see", depending on the user. As a result, the response generation device 10 can improve convenience of the interactive processing for the user who frequently forgets and the user who cannot properly pronounce the activation word.

Note that, the response generation device 10 may set a word other than the utterance of the user as the activation word. For example, there is a possibility that some users make a gesture of pointing to the response generation device 10 or waving a hand to the response generation device 10 instead of making an utterance such as "hello". In such a case, the response generation unit 50 may change the setting such that the gesture of pointing to the response generation device 10 or waving the hand to the response generation device 10 serves as a trigger for activation of the interactive processing, depending on the user.

[1-4-3. Provision of Information Used for Response Generation]

The response generation device 10 may provide various types of information used to generate the response, to the external server 200, an external service, or the like.

For example, in the above embodiment, processing has been described in which the response generation device 10 generates a response to a fragmentary conversation such as "train" or "tomorrow's" of the user. In this case, there is a case where the external server 200 that provides a service such as transfer guidance can provide a service or information that are more adapted to the intention of the user when receiving provision of a basis of the response generated by the response generation device 10. For this reason, the response generation device 10 provides the utterance of the user, the related information used for the generation processing, and the like to an external service or the like as information that is the basis of the generated response. Specifically, the response generation device 10 provides various types of information used for the response generation processing, such as what information is used as the basis to specify the operation command of the user, what is the content related to the utterance, and what is the past action history of the user related to the utterance.

As described above, after generating the response to the user, the response generation device 10 may output the related information used to generate the response, to the external device. As a result, the response generation device 10 can provide useful information to a business operator who manages the external server 200 and the like.

[1-4-4. Example of Priority Determination]

The response generation device 10 may determine priority of the response to the user depending on a device type of the response generation device 10.

For example, in a case where the response generation device 10 is a television, the response generation device 10 determines that the user is likely to utter an operation command related to the television, and increases the priority of using the operation command related to the television as a response. In other words, the response generation device 10 adjusts the weight of information used for comprehensive determination of response generation depending on the device type of the response generation device 10.

As a result, the response generation device 10 generates a response by preferentially using an operation command that is estimated to have a high probability of being desired by the user with respect to the response generation device 10, and thus, it is possible to improve convenience of the user who uses the interactive processing.

[1-4-5. Use of Interaction History]

The response generation device 10 may use not only the interaction history of the user oneself who has made the utterance but also the interaction history of another user. For example, the response generation device 10 may perform processing of estimating a conversation domain on the basis of the details of conversations of a plurality of other users around before the user makes an utterance. For example, in a case where the plurality of other users around has a conversation related to an outing, the response generation device 10 determines that the conversation is of a domain related to "outing" from an analysis result or the like of a word included in the conversation. Thereafter, in a case where there is an utterance from the user such as "tomorrow?", the response generation device 10 extracts an operation related to "outing" and generates a response to the user. As an example, the response generation device 10 extracts "weather information" as the operation related to "outing" and generates a response such as "it will be sunny tomorrow". Alternatively, the response generation device 10 extracts "schedule information" as the operation related to "outing" and generates a response such as "schedule is free tomorrow".

As described above, the response generation device 10 can make a natural response to the user who has uttered, by estimating the intention of the incomplete utterance of the user by using the interaction history of another user or the like.

Note that, the response generation device 10 may generate a response on the basis of an interaction history or the like acquired not only from the user being at the place but also from another device via the cloud as an interaction history of another user.

[1-4-6. Application of Response Generation Processing of Present Disclosure]

The response generation processing of the present disclosure can be applied not only to interactive processing such as utterance of the user, but also to various technologies. For example, the response generation processing of the present disclosure is also applicable to interactive processing via text data, such as chatting with a user using a robot.

2. OTHER EMBODIMENTS

Among the pieces of processing described in the above embodiments, all or part of the processing described as being performed automatically can be performed manually, or all or part of the processing described as being performed manually can be performed automatically by a known method. In addition, the processing procedure, specific name, and information including various data and parameters described in the document and the drawings can be arbitrarily changed unless otherwise specified. For example, the various types of information illustrated in each figure are not limited to the illustrated information.

Furthermore, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit depending on various loads, usage conditions, and the like. For example, the response unit 54 and the transmission unit 55 may be integrated.

Furthermore, the above-described embodiments and modifications can be appropriately combined within a range not contradicting processing details.

Furthermore, the effects described in the present specification are merely examples and are not limited, and other effects may be provided.

3. EFFECTS OF RESPONSE GENERATION DEVICE ACCORDING TO PRESENT DISCLOSURE

As described above, the response generation device (the response generation device 10 in the embodiment) according to the present disclosure includes the acquisition unit (the acquisition unit 40 in the embodiment) and the response generation unit (the response generation unit 50 in the embodiment). The acquisition unit acquires input information serving as a trigger for generating a response to the user. In a case where it is determined that a response to the user cannot be generated on the basis of only the input information, the response generation unit generates a response to the user by using related information related to the input information.

As a result, the response generation device according to the present disclosure can generate a response to the user even in a case where the input information is incomplete, and thus, can implement robust interactive processing. Furthermore, according to the response generation device, since the user does not need to make a request for a complete sentence or the like, the burden on the user in the interactive processing can be reduced.

Furthermore, the acquisition unit acquires voice information uttered by the user as the input information. As a result, the response generation device can implement robust interactive processing even if the details uttered by the user is incomplete.

Furthermore, the acquisition unit acquires detection information obtained by detecting an action of the user, as the input information. As a result, the response generation device can implement robust interactive processing even in a case where the intention of the user cannot be estimated only by the action of the user.

Furthermore, the response generation unit generates a response to the user by using the related information in a case where an operation command that is information for specifying the details of the response to the user cannot be determined only from the input information. As a result, the response generation device can generate a certain response to the user even in a case where an operation that the user tries to cause the response generation device to execute is unknown.

Furthermore, in a case where an operation command that is information for specifying the details of a response to the user can be determined only from the input information, and attached information that is information used for generating a response corresponding to the operation command cannot be determined only from the input information, the response generation unit generates a response to the user by using the related information. As a result, the response generation device can generate a response complemented by such information even if the details or the like is not clearly uttered by the user.

Furthermore, the response generation unit generates a response to the user by using information on a content related to the character string corresponding to the input information as the related information. As a result, the response generation device can execute an operation such as reproduction of the content according to the intention of the utterance of the user.

Furthermore, the response generation unit generates a response to the user on the basis of the name of the content including the character string corresponding to the input information. As a result, the response generation device can execute an operation such as reproduction of the content according to the intention of the utterance of the user.

Furthermore, the response generation unit generates a response to the user by using context information that is information indicating a situation at a time-point when the input information is acquired, as the related information. As a result, the response generation device can generate a response in which attached information or the like that is unknown only from the utterance of the user is complemented by the context information.

Furthermore, the response generation unit generates a response to the user by using the attribute information or the location information of the user as the context information. As a result, the response generation device can generate a response suitable for the attribute and the location of the user.

Furthermore, the response generation unit generates a response to the user by using the schedule information of the user as the context information. As a result, the response generation device can generate a response according to the actual situation of the user.

Furthermore, the response generation unit generates a response to the user by using an interaction history with the user before the input information is acquired, as the related information. As a result, the response generation device can generate a response that is not unnatural with respect to the past interaction with the user and the flow of conversation until the input information is acquired.

Furthermore, the response generation unit generates a response to the user by using the use history of the service of the user before the input information is acquired. As a result, the response generation device can generate a response according to the daily action of the user.

Furthermore, the response generation unit generates a plurality of responses to the user by using the related information, and presents the plurality of responses to the user with a priority order. As a result, the response generation device can increase the probability of generating a response according to the intention of the user, so that the satisfaction level of the user in the interactive processing can be improved.

Furthermore, after generating the response to the user, the response generation unit outputs the related information used to generate the response to an external device. As a result, the response generation device can provide useful information to an external service or the like that provides information regarding the interactive processing.

4. HARDWARE CONFIGURATION

Figure 8:
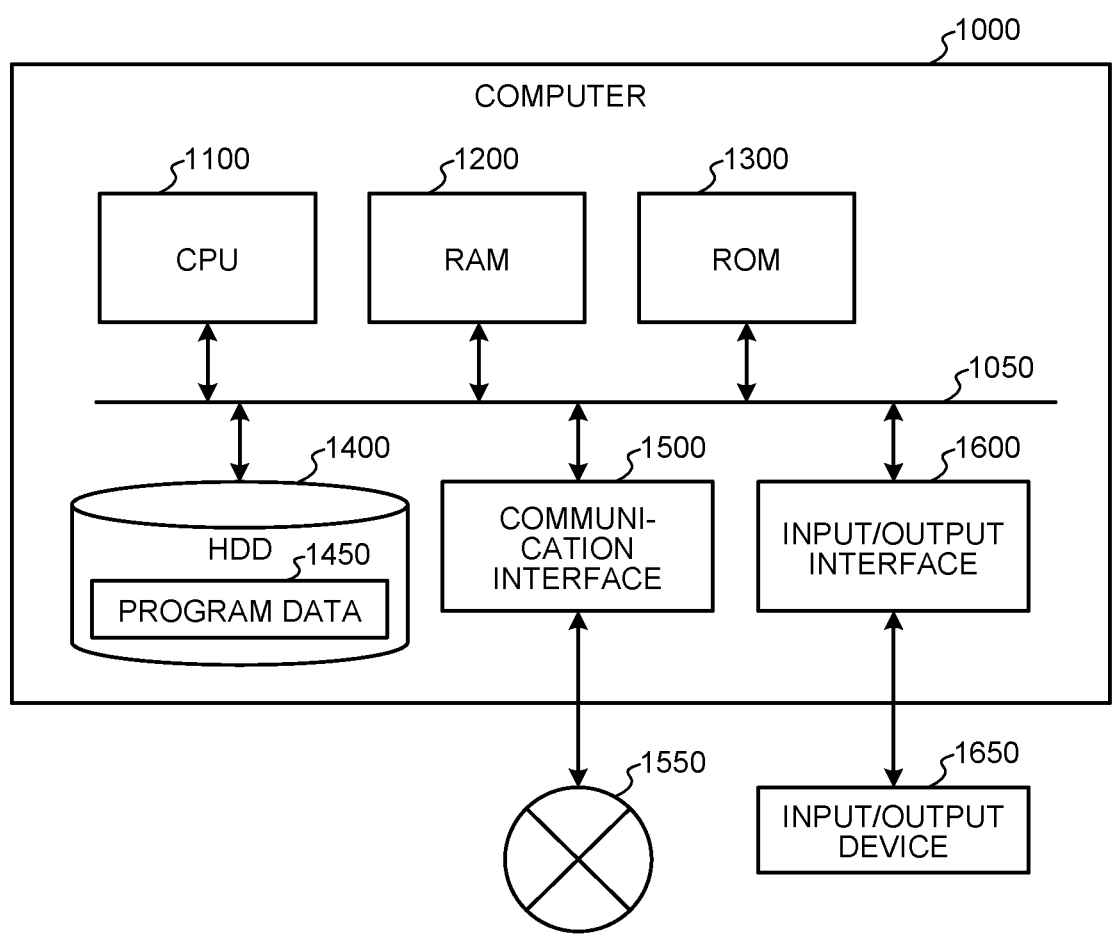
FIG. 8 is a hardware configuration diagram illustrating an example of a computer that implements functions of the response generation device.

Information devices such as the response generation device 10 and the external server 200 according to the above-described embodiments are implemented by a computer 1000 having a configuration as illustrated in FIG. 8, for example.

Hereinafter, the response generation device 10 according to the embodiment will be described as an example. FIG. 8 is a hardware configuration diagram illustrating an example of the computer 1000 that implements the functions of the response generation device 10. The computer 1000 includes a CPU 1100, a RAM 1200, a read only memory (ROM) 1300, a hard disk drive (HDD) 1400, a communication interface 1500, and an input/output interface 1600. Units of the computer 1000 are connected to each other by a bus 1050.

The CPU 1100 operates on the basis of a program stored in the ROM 1300 or the HDD 1400, and controls each unit. For example, the CPU 1100 deploys a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-temporarily records a program executed by the CPU 1100, data used by the program, and the like. Specifically, the HDD 1400 is a recording medium that records a response generation program according to the present disclosure as an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000 together. For example, the CPU 1100 receives data from an input device such as a keyboard and a mouse via the input/output interface 1600. Furthermore, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the response generation device 10 according to the embodiment, the CPU 1100 of the computer 1000 implements the functions of the acquisition unit 40 and the like by executing the response generation program loaded on the RAM 1200. Furthermore, the HDD 1400 stores the response generation program according to the present disclosure and data in the storage unit 30. Note that, the CPU 1100 reads the program data 1450 from the HDD 1400 and executes the program data, but as another example, these programs may be acquired from another device via the external network 1550.

Note that, the present technology can also have the following configurations.

(1)

A response generation device comprising:
an acquisition unit that acquires input information serving as a trigger for generating a response to a user; and
a response generation unit that generates the response to the user by using related information related to the input information in a case where it is determined that the response to the user is not able to be generated on a basis of only the input information.

(2)

The response generation device according to (1), wherein
the acquisition unit
acquires voice information uttered by the user as the input information.

(3)

The response generation device according to (1) or (2), wherein
the acquisition unit
acquires detection information obtained by detecting an action of the user, as the input information.

(4)

The response generation device according to any one of (1) to (3), wherein
the response generation unit
generates the response to the user by using the related information in a case where an operation command that is information for specifying details of the response to the user is not able to be determined only from the input information.

(5)

The response generation device according to any one of (1) to (4), wherein
the response generation unit
generates the response to the user by using the related information in a case where an operation command that is information for specifying details of the response to the user is able to be determined only from the input information and in a case where attached information that is information used for generating the response corresponding to the operation command is not able to be determined only from the input information.

(6)

The response generation device according to any one of (1) to (5), wherein
the response generation unit
generates the response to the user by using information on a content related to a character string corresponding to the input information as the related information.

(7)

The response generation device according to (6), wherein
the response generation unit generates the response to the user on a basis of a name of a content including the character string corresponding to the input information.

(8)
The response generation device according to any one of (1) to (7), wherein
the response generation unit
generates the response to the user by using context information as the related information, the context information being information indicating a situation at a time-point when the input information is acquired.

(9)
The response generation device according to (8), wherein
the response generation unit
generates the response to the user by using attribute information or location information of the user as the context information.

(10)
The response generation device according to (8) or (9), wherein
the response generation unit
generates the response to the user by using schedule information of the user as the context information.

(11)
The response generation device according to any one of (1) to (10), wherein
the response generation unit
generates the response to the user by using an interaction history with the user before the input information is acquired, as the related information.

(12)
The response generation device according to (11), wherein
the response generation unit
generates the response to the user by using a use history of a service of the user before the input information is acquired.

(13)
The response generation device according to any one of (1) to (12), wherein
the response generation unit
generates a plurality of the responses to the user by using the related information, and presents the plurality of responses to the user with a priority order.

(14)
The response generation device according to any one of (1) to (13), wherein
the response generation unit
generates the response to the user, and then outputs the related information used to generate the response to an external device.

(15)
A response generation method in which
a computer
acquires input information serving as a trigger for generating a response to a user; and
generates the response to the user by using related information related to the input information in a case where it is determined that the response to the user is not able to be generated on a basis of only the input information.

REFERENCE SIGNS LIST

1 RESPONSE GENERATION SYSTEM
10 RESPONSE GENERATION DEVICE
20 SENSOR
21 INPUT UNIT
22 COMMUNICATION UNIT
30 STORAGE UNIT
31 USER INFORMATION TABLE
32 RESPONSE RULE TABLE
40 ACQUISITION UNIT
41 DETECTION UNIT
42 REGISTRATION UNIT
43 RECEPTION UNIT
50 RESPONSE GENERATION UNIT
51 SIGNAL PROCESSING UNIT
52 VOICE RECOGNITION UNIT
53 ANALYSIS UNIT
54 RESPONSE UNIT
55 TRANSMISSION UNIT
60 OUTPUT UNIT
200 EXTERNAL SERVER

The invention claimed is:

1. A response generation device, comprising:
a central processing unit (CPU) configured to:
acquire input information that serves as a trigger to generate a response to a user;
determine that the response to the user is unable to be generated based on only the acquired input information; and
generate the response to the user by using related information related to the input information based on the determination that the response to the user is unable to be generated using only the input information,
wherein the related information includes a use history of a service used by the user via the response generation device.

2. The response generation device according to claim 1, wherein the CPU is further configured to acquire voice information uttered by the user as the input information.

3. The response generation device according to claim 1, further comprising a sensor configured to detect an action of the user, wherein
the CPU is further configured to acquire detection information as the input information, and
the detection information is based on the detection of the action of the user.

4. The response generation device according to claim 1, wherein
the CPU is further configured to generate the response to the user by using the related information in a case an operation command is unable to be determined based on only the acquired input information, and
the operation command is information to specify details of the response to the user.

5. The response generation device according to claim 1, wherein the CPU is further configured to generate the response to the user by using the related information:
in a case an operation command is able to be determined only from the input information, wherein the operation command is information to specify details of the response to the user; and
in a case attached information is unable to be determined only from the input information, wherein the attached information is information to specify details of an operation corresponding to the operation command.

6. The response generation device according to claim 1, wherein the related information includes information on a content related to a character string corresponding to the input information.

7. The response generation device according to claim 6, wherein the related information further incudes a name of the content including the character string corresponding to the input information.

8. The response generation device according to claim 1, wherein
the information includes context information, and
the context information is information indicating a situation at a time-point the input information is acquired.

9. The response generation device according to claim 8, wherein the context information includes attribute information or location information of the user.

10. The response generation device according to claim 8, wherein the context information includes schedule information of the user.

11. The response generation device according to claim 1, wherein the use history of the service used by the user is based on an interaction history with the user before the input information is acquired.

12. The response generation device according to claim 1, wherein the CPU is further configured to:
generate a plurality of responses to the user by using the related information, and
control presentation of the plurality of responses to the user with a priority order.

13. The response generation device according to claim 1, wherein the CPU is further configured to
output the related information to an external device.

14. A response generation method, comprising:
in a response generation device:
acquiring, by a central processing unit (CPU), input information serving as a trigger for generation of a response to a user;
determining, by the CPU, that the response to the user is unable to be generated based on only the acquired input information; and
generating, by the CPU, the response to the user by using related information related to the input information based on the determination that the response to the user is unable to be generated using only the input information,
wherein the related information includes a use history of a service used by the user via the response generation device.

* * * * *